(12) United States Patent
Hübl et al.

(10) Patent No.: US 11,354,599 B1
(45) Date of Patent: Jun. 7, 2022

(54) METHODS AND SYSTEMS FOR GENERATING A DATA STRUCTURE USING GRAPHICAL MODELS

(71) Applicant: BRYTER GmbH, Berlin (DE)

(72) Inventors: Michael Hübl, Bensheim (DE); Michael Grupp, Berlin (DE)

(73) Assignee: BRYTER GmbH, Berlin (DE)

( * ) Notice: Subject to any disclaimer, the term of this patent is extended or adjusted under 35 U.S.C. 154(b) by 0 days.

(21) Appl. No.: 17/358,213

(22) Filed: Jun. 25, 2021

(51) Int. Cl.
| | | |
|---|---|---|
| G16H 10/60 | (2018.01) | |
| G16H 70/60 | (2018.01) | |
| G06Q 40/02 | (2012.01) | |
| G06N 20/00 | (2019.01) | |
| G06K 9/62 | (2022.01) | |
| G06F 16/901 | (2019.01) | |

(52) U.S. Cl.
CPC ......... G06N 20/00 (2019.01); G06F 16/9027 (2019.01); G06K 9/6267 (2013.01)

(58) Field of Classification Search
CPC ... G06N 20/00; G06F 16/9027; G06K 9/6267
USPC ...................................................... 706/1–62
See application file for complete search history.

(56) References Cited

U.S. PATENT DOCUMENTS

| | | | |
|---|---|---|---|
| 5,742,836 A | 4/1998 | Turpin | |
| 7,007,035 B2 | 2/2006 | Kamath | |
| 9,292,797 B2 | 3/2016 | He | |
| 9,489,630 B2 | 11/2016 | Achin | |
| 10,075,384 B2 | 9/2018 | Shear | |
| 10,339,465 B2 | 7/2019 | Steele | |
| 10,817,530 B2 | 10/2020 | Siebel | |
| 10,908,788 B2 | 2/2021 | Ignatyev | |
| 2015/0324547 A1* | 11/2015 | Graham | G16H 70/60 705/2 |
| 2017/0039324 A1* | 2/2017 | Francois | G16H 10/60 |
| 2019/0259470 A1 | 8/2019 | Olafson | |
| 2020/0184278 A1 | 6/2020 | Zadeh | |
| 2020/0320619 A1* | 10/2020 | Motaharian | G06N 5/003 |

OTHER PUBLICATIONS https://buildmedia.readthedocs.org/media/pdf/orange3/3.5.0/orange3.pdf Title:Orange Visual Programming Documentation Release 3 By: University of Ljubljana Date: Sep. 27, 2017.

* cited by examiner

*Primary Examiner* — Brandon S Cole
(74) *Attorney, Agent, or Firm* — Caldwell Intellectual Property Law; Keegan Caldwell; Micah Drayton

(57) ABSTRACT

A system for generating a data structure using graphical models includes a computing device configured to provide a visual interface configured to provide a plurality of graphical models of a plurality of rule modules and receive a relational identification of at least a graphical representation of the plurality of graphical models, the relational indication including at least an entry indication and at least an exit indication, to convert the relational identification into at least a decision tree having at least a root node corresponding and at least a terminal node, to train a machine-learning model to match execution parameters to the at least a root node, and to generate an execution result interface configured to receive at least an execution parameter, map it to the at least a root node using the machine-learning model, and generate an execution result at the at least a terminal node.

20 Claims, 15 Drawing Sheets

□ SEND EMAIL ▾  [ send_email    ▾ ]

SEND TO
[ ask_email_details ▸ Email ✕   Recipient email address ]

SUBJECT
[ Your draft unilateral/mutual NDA between party1 ▸ Legal entity name and party2 ▸ Legal entity name ]
                                    ↑ 604

FROM NAME (OPTIONAL)
[ NDA Generation Service ]

REPLY TO (OPTIONAL)
[ Add reply to ]

CONTENT
[ ₸ ▾  B  *I*  U  ≡  ≡  𝒫 ]    ⊕ INSERT ▾
                                              ↖ 604
Dear ask_email_details ▸ Name, you have generated a unilateral/mutual NDA between party2 ▸ Legal entity name and party2 ▸ Legal entity name.

Please find the draft document attached to this email.

DELETE

| Case database fields | | |
|---|---|---|
| Field | | Type |
| tool_name | UNIQUE IDENTIFIER | ID |
| description | | Text |
| admin_name | | Text |
| admin_email | | Email |
| additional_admin_name | | Text |
| additional_admin_email | | Email |
| contact_name | | Text |
| contact_email | | Email |
| start_date | | Date |

*FIG. 8*

METHODS AND SYSTEMS FOR GENERATING A DATA STRUCTURE USING GRAPHICAL MODELS

FIELD OF THE INVENTION

The present invention generally relates to the field of artificial intelligence simulation and modeling. In particular, the present invention is directed to methods and systems for generating a data structure using graphical models.

BACKGROUND

Generations of data structures and executable code often suffers due to technical and domain data silos. This can result in fundamentally sound configurations that produce different results than those intended.

SUMMARY OF THE DISCLOSURE

In an aspect, a system for generating a data structure using graphical models includes a computing device configured to provide a visual interface at a remote device, the visual interface configured to provide a plurality of graphical models of a plurality of rule modules, wherein each graphical representation of the plurality of graphical models represents a rule module of the plurality of rule modules and receive a relational identification of at least a graphical representation of the plurality of graphical models, the relational indication including at least an entry indication and at least an exit indication. The computing device is configured to convert the relational identification into at least a decision tree having at least a root node corresponding to the at least an entry indication and at least a terminal node corresponding to the at least an exit indication. The computing device is configured to train a machine-learning model to match execution parameters to the at least a root node. The computing device is configured to generate an execution result interface configured to receive at least an execution parameter, map the at least an execution parameter to the at least a root node using the machine-learning model, and generate an execution result at the at least a terminal node using the at least a decision tree.

In another aspect, a method of generating a data structure using graphical models includes providing, by a computing device, a visual interface at a remote device, the visual interface configured to provide a plurality of graphical models of a plurality of rule modules, wherein each graphical model of the plurality of graphical models represents a rule module of the plurality of rule modules and receive a relational identification of at least a graphical model of the plurality of graphical models, the relational indication including at least an entry indication and at least an exit indication. The method includes converting, by the computing device, the relational identification into a relational model at least a decision tree having at least a root node corresponding to the at least an entry indication and at least a terminal node corresponding to the at least an exit indication. The method includes training, by the computing device, a machine-learning model to match execution parameters to the at least a root node. The method includes generating, by the computing device, an execution result interface configured to receive at least an execution parameter, map the at least an execution parameter to the at least a root node using the machine-learning model, and generate an execution result at the at least a terminal node using the at least a decision tree.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is a screenshot illustrating an exemplary embodiment of a visual interface;

FIG. 6 is a screenshot illustrating an exemplary embodiment of a visual interface;

FIG. 8 is a screenshot illustrating an exemplary embodiment of a visual interface;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments described herein provide a visual interface suitable for automated generation of decision trees using graphical models of rule modules, and association of execution parameters to root nodes using machine-learning models. Machine-learning models may include classifiers such as naïve Bayes classifiers or the like. Training data may be iteratively updated, and machine-learning processes may be iteratively performed utilizing updated training data.

Figure 1:
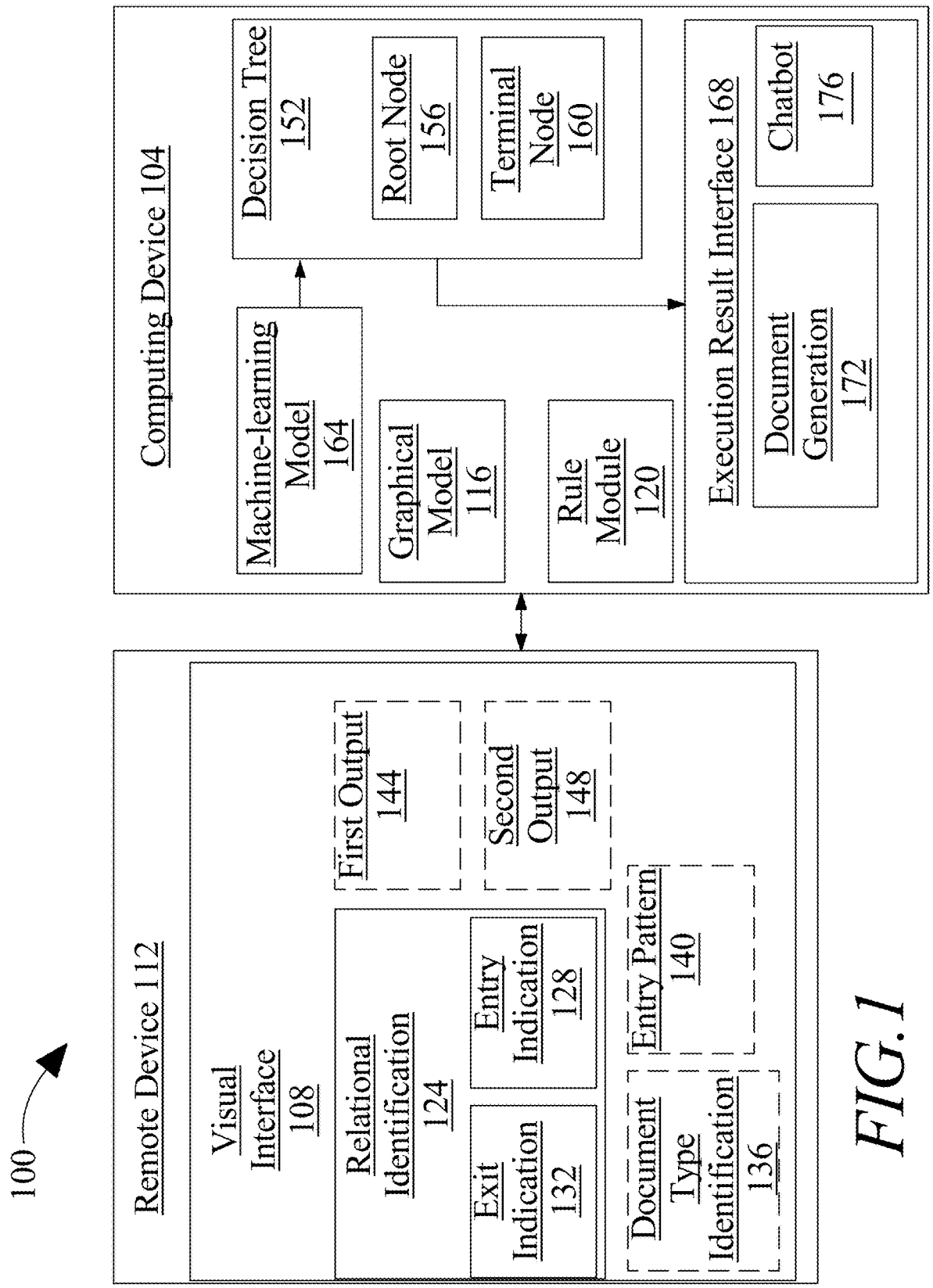
FIG. 1 is a block diagram illustrating an exemplary embodiment of a system for generating a data structure using graphical models.

Referring now to FIG. 1, an exemplary embodiment of a system 100 generating a data structure using graphical models is illustrated. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, and continuing to refer to FIG. 1, computing device 104 is configured to provide a visual interface 108 at a remote device 112. Remote device 112 may include any device suitable for use as computing device 104, including without limitation an end-user device such as a desktop computer, work terminal, laptop computer, netbook, mobile device such as a smartphone or tablet, or the like. A "visual interface," as used in this disclosure, graphical user interface (GUI) that displays graphical models, as defined below, to a user of a remote device 112 and permits user to manipulate, move, edit, connect together, and/or otherwise interact with such graphical models 116 and/or combinations thereof. Visual interface 108 may include a window in which graphical models, and/or combinations thereof, to be used may be displayed. Visual interface 108 may include one or more graphical locator and/or cursor facilities allowing a user to interact with graphical models and/or combinations thereof, for instance using a touchscreen, touchpad, mouse, keyboard, and/or other manual data entry device. Visual interface 108 may include one or more menus and/or panels permitting selection of tools, options, graphical models to be displayed and/or used, elements of data, functions, or other aspects of graphical models to be edited, added, and/or manipulated, options for importation of and/or linking to application programmer interfaces (APIs), exterior services, databases, machine-learning models, and/or algorithms, or the like. Persons skilled in the art, upon reviewing the entirety of this disclosure, will be aware of various ways in which a visual interface 108 and/or elements thereof may be implemented and/or used as described in this disclosure.

Still referring to FIG. 1, visual interface 108 is configured to provide a plurality of graphical models 116 of a plurality of rule modules 120, where each graphical representation of the plurality of graphical models 116 represents a rule module 120 of the plurality of rule modules 120. A "rule module," as used in this disclosure, is a set of one or more computer-executable instructions that receives input data and produces output data. As a non-limiting example, a rule module 120 may compare two or more elements of input data to each other, perform any arithmetic or logical operation on two or elements of input data, compare one or more elements of input data to global or constant values, perform any logical or arithmetic operation with one or more elements of input data and global or constant values, perform any sequential or parallel combination of any such steps, and/or produce any output that may be generated by any computer program or function using any input thereto. Rule modules 120 may implement rules dictating selection of one of a plurality of outputs, and/or a subsequent rule module 120 to receive an output result. Rule modules 120 may be stored as executable code and/or machine-readable code, source code, assembly code, and/or any other suitable form, in any form of non-transitory memory. A "graphical model" of a rule module 120, as used in this disclosure, is a graphical representation of the rule module 120 having a graphical input port corresponding into input parameters of the rule module 120 and a graphical output port corresponding to output and/or return values of the rule module 120; input and output ports may be illustrated in any visually intelligible manner, including without limitation as locations where lines, arrows, or other elements visually showing connections to another rule module 120, an overall input and/or output of a decision tree or data structure, or the like may be and/or are attached.

With continued reference to FIG. 1, visual interface 108 is configured to receive a relational identification 124 of at least a graphical model 116 of the plurality of graphical models 116. A "relational identification," as used in this disclosure, is a selection of a graphical representation, or a set of them, and an application thereof to some decision or logical relationship relating an input to a data structure to be generated as described in this disclosure to an output thereof. Relational indication includes at least an entry indication 128; an "entry indication 128," as used in this disclosure, is a user identification of one or more inputs to a relational indication. Relational indication includes at least an exit indication 132. An "exit indication 132," as used in this disclosure, is a user identification of one or more outputs from a relational indication. Relational indication may be provided via a manual input in which user selects one or more graphical models 116 and indicates relationships therebetween, inputs, and/or output thereof, or the like. A manual input may manually link one or more graphical models 116 to one or more decision criteria and/or other elements of domain knowledge as described below: in other words, when selecting and/or building graphical models 116, a user may manually input decision criteria and/or examples suitable for derivation of decision criteria. Visual interface 108 may alternatively or additionally be configured to receive one or more user inputs linking to a decision calculation module, where a "decision calculation module" may include any computer program, process and/or module, already existing, which performs one or more processes as part of a computation used by a rule module 120. For instance, an organization and/or user may have one or more systems, programs, and/or modules such as "calculation engines," one or more existing databases, and/or one or more other resources used to determine a given decision or other calculation to be incorporated in and/or used by a rule module 120; in such a case, rule module 120 may transmit data to such a system, program, module, database, and/or resource and receive therefrom one or more outputs which rule module 120 may use as and/or form outputs thereof, including any output as described above.

Still referring to FIG. 1, visual interface 108 may provide to user one or more templates for creation of rules and/or relational indications. A template for a rule, for instance, may include a rule type of the rule, one or more default fields, data elements, and/or functions, a field for a label and/or name for the rule, or the like. Visual interface 108 may be configured to receive user inputs creating or deleting one or more fields, filling in coefficients and/or other parameters, applying one or more API links and/or other interface elements to one or more fields, addition of one or more identifications of database names, locations, tables, and/or other elements, references to and/or incorporation of any other template, or the like. Relational interface templates may include one or more default rule types, one or more default and/or typical combination of rules in a given configuration, or the like. For instance, a relational interface template may include a default combination of rules representing a "stack" of application layers for a given type of application, where layers may include data access layers that query databases, analytics or "logic" layers that perform and/or incorporate one or more calculations and/or other analytical steps to accomplish application goals, and/or one or more "interface" layers for generation of reports, web pages, GUIS, data links to other systems, applications, and/or devices, or the like. Persons skilled in the art, upon reviewing the entirety of this disclosure, will be aware of various alternative or additional relational indication templates that may be used consistently with this disclosure.

With continued reference to FIG. 1, visual interface 108 may be configured to incorporate in one or more rules and/or relational indications links to databases and/or database tables containing one or more elements of data, calculation parameters such as coefficients, weights, biases, or the like, program instructions, and/or any other element of a rule and/or relational indication that is storable in computer memory as described in this disclosure. Incorporation and/or link to databases from rules and/or relational indications may be performed by static and/or dynamic entry and/or generation of one or more database queries, such as without limitation queries written in and/or utilizing structure query language (SQL) or the like.

Still referring to FIG. 1, visual interface 108 may be configured to incorporate in one or more rules and/or relational indication links to APIs providing data structures, functions, and/or outputs of, using, and/or computing data, calculation parameters such as coefficients, weights, biases, or the like, program instructions, and/or any other element of a rule and/or relational indication that is storable in computer memory as described in this disclosure. Incorporation and/or link to databases from rules and/or relational indications may be performed by static and/or dynamic entry links to such APIs. As a non-limiting example, APIs may be preconfigured in software to be called for performance of certain categories of procedures, and/or invoked by certain rule modules. Alternatively or additionally, API integration may be performed using user-input commands, such as commands to include or import APIs, calls to API functions or routines, or the like.

Still referring to FIG. 1, visual interface 108 may be further configured to receive at least a domain information identification corresponding to the relational identification 124. A "domain information identification," as used in this disclosure, is an element of data describing domain knowledge, where "domain knowledge" is knowledge concerning one or more real-world phenomena to be modeled by computing device 104. Examples of domain knowledge may include without limitation legal knowledge, financial knowledge, medical knowledge, scientific knowledge, or the like. Domain information identification may include one or more decision criteria, where "decision criteria" as used in this disclosure are calculations, computations, comparisons, or other relationships between data usable to traverse one or more nodes of a decision tree as described in further detail below. Decision criteria may include and/or be determined one or more elements of one or more elements of conditional or fuzzy logic, defined as logic employing inferential rules that operate on linguistic variables, where linguistic variables are sets of values defined and/or established using probabilistic membership functions as described in further detail below. For instance, and without limitation, a decision criterion may directly compare one or more inputs to one or more preconfigured threshold values, and/or may determine set membership in sets representing linguistic variables and defined by membership functions. As an example, a legal determination, such as whether a given act is in compliance with a law or regulation, may depend upon likely decisions by factfinders such as judges, arbitrators, governmental legal workers, or the like concerning whether the act qualifies as a first legally defined act or a second legally defined act, and thereafter according to one or more second determinations by such factfinders about what category of compliant behavior, illegal behavior, or the like such first and/or second legally defined act may belong to; each such factfinder determination may be represented by linguistic variables whose values are fuzzy sets defined by membership functions, and outputs of inferential determinations generated therewith may represent both a most probable and/or selected outcome and a degree of probability of such outcome, which may be comparable to degrees of probability of less likely outcomes, compared to a threshold indicating a minimal probability suitable to make a decision and/or determination, or the like. Similar results may be achieved through computational models and/or scoring attributing specific score values or formulas to specific variables.

Further referring to FIG. 1, decision criteria may be evaluated using decision calculation modules, which may be implemented as any hardware or software module. A decision calculation module may be imported via an API, by incorporation of a program module in source code, executable, or other form, and/or linked to a given node by establishing a communication interface with one or more exterior processes, programs, systems, remote devices 112, or the like; for instance, where a user operating system 100 has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision. Domain knowledge may be used to map execution parameters to root nodes as described in further detail below and/or to train machine-learning models to perform such mapping; could be used as training data for document types, entry patterns or the like. Domain knowledge may be saved to a relational or non-relational database as described in further detail below.

With continued reference to FIG. 1, visual interface 108 may be further configured to receive at least a document type identification 136 corresponding to the at least an entry indication 128. As used in this disclosure, a "document type identification" is an identification of a type and/or category of document a given root node, rule module 120, or the like is configured to receive. For instance, a root node and/or rule module 120 corresponding to initial reception and/or analysis of a last will and testament or other document conveying assets of a decedent may be associated by visual interface 108 with a "will" or "trust" document type. Visual interface 108 may receive one or more examples of documents that fit a given document type; such examples, as well as examples associated with different document types, may be used as and/or in training data for machine-learning processes as described in further detail below.

Still referring to FIG. 1, visual interface 108 may be further configured to receive at least an entry pattern 140 corresponding to the at least an entry indication 128. As used in this disclosure, an "entry pattern" is a category of execution parameters which a given root note and/or rule module 120 is configured to receive. For instance, a root node and/or rule module 120 may be configured to input data fitting an entry pattern 140 linked to "user data," which may include a username, age, height, weight, sex, demographic data, username, login credentials, or the like. Visual interface 108 may be configured to receive examples linking data sets and/or factual patterns to entry patterns 140, which may be used as and/or with training data for machine-learning processes as described below. Such examples may be received in domain knowledge as described above. Examples may be stored in databases and/or database entries as described in further detail below.

Continuing to refer to FIG. 1, visual interface 108 may be configured to produce a first output showing one or more graphical models 116, relational identifications 124, and/or integrations therein of domain knowledge and/or exterior resources. First output 144 may represent a "developer" view and/or integrated development environment (IDE) to facilitate and/or enable selection and/or generation of rule modules 120 and/or graphical models 116 thereof, as well as relational indications and/or further structures constructed thereby. First output 144 may include a debugger interface, which may "step through" any rule modules 120, API objects and/or functions, and/or other elements generated by system 100 to permit a user developing data structure to view execution, check for design flaws and bugs, or the like; debug interface may display or enable display of variable and/or parameter values, errors in execution that result from one or more design flaws or unexpected data, or the like.

Still referring to FIG. 1, visual interface 108 may be configured to produce a second output 148 configured to demonstrate an end user experience of data structure. In other words, visual interface 108 may be further configured to generate a simulated execution interface. As used in this disclosure, a "simulated execution interface" is an interface that displays and/or imitates one or more elements of an execution result interface as defined in further detail below. Simulated execution interface may display results and/or outputs of fully or partially built and/or debugged data structure, application, or other item being developed using system 100. Visual interface 108 may display first output 144 and/or second output 148 concurrently and/or sequentially; a user may be able to toggle between first output 144 and second output 148, to display them side-by side in different panes, or the like.

With continuing reference to FIG. 1, computing device 104 is configured to convert relational identification 124 into at least a decision tree 152. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree 152 has at least a root node 156, or node that receives data input to the decision tree 152, corresponding to at least an entry indication 128. Decision tree 152 has at least a terminal node 160, which may alternatively or additionally be referred to herein as a "leaf node," corresponding to at least an exit indication 132; in other words, decision and/or determinations produced by decision tree 152 may be output at the at least a terminal node 160. Decision tree 152 may include one or more internal nodes, defined as nodes connecting outputs of root nodes 156 to inputs of terminal nodes 160. Computing device 104 may generate two or more decision trees 152, which may overlap; for instance, a root node 156 of one tree may connect to and/or receive output from one or more terminal nodes 160 of another tree, intermediate nodes of one tree may be shared with another tree, or the like.

Still referring to FIG. 1, computing device 104 may build decision tree 152 by following relational identification 124; for example, relational indication may specify that a first rule module 120 receives an input from at least a second rule module 120 and generates an output to at least a third rule module 120, and so forth, which may indicate to computing device 104 an in which such rule modules 120 will be placed in decision tree 152. Building decision tree 152 may include recursively performing mapping of execution results output by one tree and/or subtree to root nodes 156 of another tree and/or subtree, for instance by using such execution results as execution parameters of a subtree. In this manner, computing device 104 may generate connections and/or combinations of one or more trees to one another to define overlaps and/or combinations into larger trees and/or combinations thereof. Such connections and/or combinations may be displayed by visual interface 108 to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules 120, with graphical models 116 representing them, and which may then be used in further iterations or steps of generation of decision tree 152 and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees 152 may transmit data and from which further iterations or steps of generation of data structure receive data, for instance as part of a decision in a given decision tree 152 node.

Continuing to refer to FIG. 1, decision tree 152 may incorporate one or more manually entered or otherwise provided decision criteria. Decision tree 152 may incorporate one or more decision criteria using an API. Decision tree 152 may establish a link to a remote decision module, device, system, or the like. Decision tree 152 may perform one or more database lookups and/or look-up table lookups. Decision tree 152 may include at least a decision calculation module, which may be imported via an API, by incorporation of a program module in source code, executable, or other form, and/or linked to a given node by establishing a communication interface with one or more exterior processes, programs, systems, remote devices 112, or the like; for instance, where a user operating system 100 has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Still referring to FIG. 1, computing device 104 is configured to train a machine-learning model 164 to match inputs to at least a root node 156. A "machine learning process," as used in this disclosure, is a process that automatedly uses training data to generate an algorithm and/or model, defined as a "machine-learning model" that will be performed by a computing device 104/module to produce outputs given data provided as inputs, for instance and without limitation as described in further detail below; this is in contrast to a non-machine learning software program where the commands to be executed are determined in advance by a user and written in a programming language. Training data, which may include any training data as described in further detail below, is data including correlations and/or examples usable by a machine learning algorithm to generate a machine-learning model 164 and/or to be operated on by a lazy learning algorithm as described below. Training data may be obtained by computing device 104 in any manner and/or form as described anywhere in this disclosure, including and without limitation in the form of domain knowledge, which may be used to map execution parameters to root nodes 156 as described in further detail below and/or to train machine-learning models 164 to perform such mapping, training data based on document type and/or entry patterns 140, or the like.

Continuing to refer to FIG. 1, machine-learning model 164 may include a classifier, which may classify inputs to at least a root node 156 and/or to document types, entry patterns 140, or other categories of inputs associated with root node 156. A "classifier," as used in this disclosure is a machine-learning model 164, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees 152, boosted trees, random forest classifiers, learning vector quantization, and/or neural network-based classifiers. As a further non-limiting example, classification may be performed using a neural network classifier such as without limitation a convolutional neural network-based classifier. A convolutional neural network is a neural network in which at least one hidden layer is a convolutional layer that convolves inputs to that layer with a subset of inputs known as a "kernel," along with one or more additional layers such as pooling layers, fully connected layers, and the like.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, machine-learning model 164 may be configured to classify the input to a document type and map the input to the at least a root node 156 as a function of the document type. machine-learning model 164 may be configured to classify the input to a fact pattern and map the input to the at least a root node 156 as a function of the fact pattern. Machine-learning model 164 may be used to map output of one decision tree 152 to input of another, for instance, and without limitation, using classification as described above or the like. Where two trees are combined, for instance as represented by graphical models 116, such a mapping may be used to combine such trees automatically and/or to propose their combination automatically.

Further referring to FIG. 1, computing device 104 is configured to combine decision tree 152 and machine-learning model 164 to form a data structure. Data structure and/or parameters thereof may be stored in any suitable database, such as an enterprise database as described in further detail below.

Still referring to FIG. 1, computing device 104 is configured to generate an execution result interface 168, for instance and without limitation using data structure and/or components thereof. An "execution result interface," as used in this disclosure, is a component and/or set of components incorporating decision tree 152, machine-learning model 164, and/or any other components generate by computing device 104, and provision of an output of decision tree 152 to one or more end-users and/or recipient devices. Execution result interface 168 is configured to receive at least an execution parameter. An "execution parameter," as used in this disclosure, is one or more elements of data to be input to a root node 156. Execution parameter may have any form described above, including an entry pattern 140, a document, or the like. Execution parameter may be received from and/or via a "chat bot" as described in further detail below; for instance, a first user entry and/or set of entries to a chat bot may be converted to an entry pattern 140 and/or used to retrieve a document, either or both of which may be classified to one or more root nodes 156, initiating execution of one or more decision trees 152. Alternatively or additionally, execution parameter may be received from a web form or other GUI of a web page, a native application on a user device, or the like, via submission and/or uploading of a document, and/or during batch process in which a file, series of entry patterns 140, and/or series of documents are processed sequentially by repeated classification to root nodes 156 and performance of decision trees 152. Execution result interface 168 is configured to map at least an execution parameter to at least a root node 156 using the machine-learning model 164. In an embodiment, and without limitation, a language processing module and/or process may extract one or more terms from documents and/or chatbot 176 user entries to generate an entry pattern 140 to be classified; alternatively or additionally, an entire contents of a document and/or chatbot 176 entry and/or conversation may be classified. Execution result interface 168 is configured to generate an execution result at the at least a terminal node 160 using the at least a decision tree 152. In other words, execution result interface 168 may execute decision tree 152 and produce one or more outputs from terminal nodes 160.

With continued reference to FIG. 1, execution result interface 168 may perform one or more additional actions after receiving an output at terminal nodes 160. For instance, and without limitation, execution result interface 168 may be configured to generate a document as a function of the output. Document generation 172 may be performed without limitation, using natural language processing and/or modules. Natural language processing may include any methods and/or processes for natural language processing described in this disclosure. Alternatively or additionally, in some embodiments, computing device 104 may interface conversationally with user by using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Further referring to FIG. 1, language processing module may operate to produce a language processing model. Language processing model may include a program automatically generated by computing device 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Further referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, document generation 172 may make use of one or more document templates. Document templates may include one or more files having fields in a prearranged order and/or structure; fields may be marked as receiving one or more categories of data in textual and/or numerical form, one or more images, or the like. Fields may be filled using one or more outputs from terminal nodes 160. For instance, in some embodiments, an output may be added directly to a field, such as a numerical field calling for a number in a form in which such a number is output at a terminal node 160. Output may alternatively or additionally be formatted for entry in field; a field may, for instance, be configured to automatically add commas, points, currency symbols, dashes, parentheses, or the like to numerical fields.

Still referring to FIG. 1, one or more textual fields and/or entries therein may be filled directly using output from a terminal node 160. For instance, one or more textual fields may include fields inserted in partially completed sentences, which may be completed by insertion of outputs in textual form from terminal node 160. Alternatively or additionally, outputs in numerical and/or textual form may be mapped to one or more phrases, sentences, paragraphs, and/or other units of text. Such mappings may be performed using one or more linguistic variables. For instance, numerical outputs may be tested for membership in one or more membership functions and mapped in turn to verbal descriptions. Linguistic variable descriptions and/or textual outputs at terminal nodes 160 may be mapped using a vector space to matching and/or related sentences, phrases, paragraphs, and/or other textual elements. In an embodiment, execution result interface 168 may be configured to perform other modifications of text using language processing. For instance, execution result interface 168 may detect duplicate phrases and/or sentences and replace with closely matched synonyms using synonym detection based, for instance on vector similarity in a vector space as described above.

Still referring to FIG. 1, execution result interface 168 may be configured to initiate a textual conversation with a remote device 112 as a function of the output. In some embodiments, execution result interface 168 may be configured to interface conversationally with a user by way of a chatbot 176. A chatbot 176, in some cases, may be used to generate text that is used to interface conversationally with user. In some versions, user may respond to computing device 104, by way of a text-based interface, for example without limitation short message service (SMS) text message. Interfacing conversationally may additionally include receiving a submission. Interfacing conversationally may include recognizing at least a word or phrase in the submission, for instance and without limitation by inputting the submission to a language processing model and recognizing the at least a word as a function of the language processing model. Interfacing conversationally may include generating a response as a function of the at least a word.

Still referring to FIG. 1, according to some embodiments, a user interface may be communicative with a chatbot 176. A submission once received by computing device 104 operating a chatbot 176, may be processed by a processor. In some embodiments, processor processes a submission using one or more of keyword recognition, pattern matching, and natural language processing. In some embodiments, processor employs real-time learning with evolutionary algorithms. In some cases, processor may retrieve a pre-prepared response from at least a storage component, based upon submission. Alternatively or additionally, in some embodiments, processor communicates a response without first receiving a submission, thereby initiating conversation. In some cases, processor communicates an inquiry to user interface; and the processor is configured to process an answer to the inquiry in a following submission from the user interface.

In an embodiment, execution result interface 168 may be configured to generate an entry pattern 140 using the at least a user input. Execution result interface 168 may generate entry pattern 140 by extracting one or more words or phrases from the input, and/or analyzing one or more words or phrases; extraction and/or analysis may include tokenization, for instance as described above in relation to language processing module. In an embodiment, execution result interface 168 may utilize, incorporate, or be a language processing module as described above. Language processing module may be configured to map at least a user input to entry pattern 140, using any process as described above for a language processing module. Extraction and/or analysis may further involve polarity classification, in which execution result interface 168 may determine, for instance, whether a phrase or sentence is a negation of the semantic content thereof, or a positive recitation of the semantic content. Polarity classification may be performed, without limitation, by consultation of a database of words that negate sentences, and/or geometrically within a vector space, where a negation of a given phrase may be distant from the non-negated version of the same phrase according to norms such as cosine similarity.

Still referring to FIG. 1, execution result interface 168 may be configured to normalize one or more words or phrases of user input, where normalization signifies a process whereby one or more words or phrases are modified to match corrected or canonical forms; for instance, misspelled words may be modified to correctly spelled versions, words with alternative spellings may be converted to spellings adhering to a selected standard, such as American or British spellings, capitalizations and apostrophes may be corrected, and the like; this may be performed by reference to one or more "dictionary" data structures listing correct spellings and/or common misspellings and/or alternative spellings, or the like. Execution result interface 168 may perform algorithms for named entity recognition. Named entity recognition may include a process whereby names of users, names of informed advisors such as doctors, medical professionals, coaches, trainers, family members or the like, addresses, place names, entity names, or the like are identified; this may be performed, without limitation, by searching for words and/or phrases in user database. For instance, execution result interface 168 may identify at least a phrase, which may include one or more words, map the at least a phrase to entry pattern 140 element, and then assemble a query using the entry pattern 140 element. Mapping at least a phrase to entry pattern 140 element may be performed using any language processing technique described in this disclosure, including vector similarity techniques.

With continued reference to FIG. 1, execution result interface 168 may extract and/or analyze one or more words or phrases by performing dependency parsing processes; a dependency parsing process may be a process whereby execution result interface 168 and/or a language processing module communicating with and/or incorporated in execution result interface 168 recognizes a sentence or clause and assigns a syntactic structure to the sentence or clause. Dependency parsing may include searching for or detecting syntactic elements such as subjects, objects, predicates or other verb-based syntactic structures, common phrases, nouns, adverbs, adjectives, and the like; such detected syntactic structures may be related to each other using a data structure and/or arrangement of data corresponding, as a non-limiting example, to a sentence diagram, parse tree, or similar representation of syntactic structure. Execution result interface 168 may be configured, as part of dependency parsing, to generate a plurality of representations of syntactic structure, such as a plurality of parse trees, and select a correct representation from the plurality; this may be performed, without limitation, by use of syntactic disambiguation parsing algorithms such as, without limitation, Cocke-Kasami-Younger (CKY), Earley algorithm or Chart parsing algorithms. Disambiguation may alternatively or additionally be performed by comparison to representations of syntactic structures of similar phrases as detected using vector similarity, by reference to machine-learning algorithms and/or modules.

Still referring to FIG. 1, execution result interface 168 may combine separately analyzed elements from at least a user input together to form an entry pattern 140; elements may include words, phrases, sentences, or the like, as described above. For instance, two elements may have closely related meanings as detected using vector similarity or the like; as a further non-limiting example, a first element may be determined to modify and/or have a syntactic dependency on a second element, using dependency analysis or similar processes as described above. Combination into an entry pattern 140 may include, without limitation, concatenation. Alternatively or additionally, execution result interface 168 may detect two or more entry patterns 140 in a single user input of at least a user input.

With continued reference to FIG. 1, execution result interface 168 may be configured to convert entry pattern 140 into at least a canonical or standard form of entry pattern 140; for instance, and without limitation, once an entry pattern 140 has been detected, execution result interface 168 may convert it to a highly closely related entry pattern 140 based on vector similarity, where the highly closely related entry pattern 140 is labeled as a standard form or canonical entry pattern 140. In an embodiment, converting to a standard form entry pattern 140 may enable more efficient processing of entry patterns 140.

Continuing to refer to FIG. 1, execution result interface 168 and/or a chatbot 176 may be configured to generate the at least a textual output as a function of the entry pattern 140. This may be performed, without limitation, by submitting entry pattern 140 to one or more root nodes 156 of decision trees 152 as described above, which may generate outputs; outputs may be converted to textual outputs using language processing and/or other processes suitable for generation of textual entries in generated documents as described above. An additional upstream layer may extend an input/output pattern to a natural language dialogue flow, for instance using any language processing methods as described above. As a non-limiting example, an input/output pattern may be classified using vector distances and/or any form of classification process to a pattern including input/output data recorded thus far as well as a subsequent response or series of responses; subsequent responses and/or series of responses may be generated and/or output by system and/or chatbot 176 as a result of such matching and/or classification. Upstream layer may alternatively or additionally classify actions to statements and/or responses. For instance, and without limitation, upstream layer may classify a selection of a particular document, a user input, and/or an omission such as skipping a particular input to a textual response, which may, as a non-limiting example, include a question inquiring why a user has not entered a given input, a statement describing inputs that could be used, or the like. Chatbot 176 and/or upstream layer may be configured to map natural language inputs received from a user to function calls, root nodes, and/or entry points as described above. For instance, and without limitation, natural language inputs may be classified to root nodes, entry patterns, or the like using any classification process described above. Classifiers may be trained using training data specific to a service, context, or the like. Classifiers, chatbot, upstream layer, and/or other components may be configured via the standard editing interface. In some embodiments, another layer may translate text output to voice output and/or voice input to text input using, for instance, speech-to-text and/or text-to-speech modules.

Further referring to FIG. 1, execution result interface 168 may include and/or generate one or more event handers to trigger initiation of one or more processes involving decision tree 152, machine-learning models 164, execution results, and/or downstream processing such as chatbot 176 and/or document generation 172 processes. One or more event handlers may be triggered, without limitation, by user input, receipt of one or more messages or other signals from additional devices, passage of a particular amount of time, or the like. Event handlers may further process end-user approvals of outputs and/or processes, including without limitation approval by particular users as identified by authentication information or the like.

Still referring to FIG. 1, execution result interface 168 may configure one more downstream devices to perform any steps and/or series of steps execution result interface 168 is configured to perform. For instance, execution result interface 168 may perform actions of a client-side and/or server-side web application, including any suitable configuration such as cloud computing, "thin client computing," use of client-side computing such as scripting languages and/or plug-ins, or the like. As a further non-limiting example, execution result interface 168 may include and/or generate a native and/or mobile application. Server-side elements of and/or generated by execution result interface 168 may be hosted on computing device 104 and/or on another server and/or webservice.

Further referring to FIG. 1, computing device 104 may be configured to export one or more elements of execution result interface 168 to another device, such as a remote device 112 as described above. For instance, and without limitation, computing device 104 may export a decision tree 152, a portion of a decision tree 152, and/or one or more machine-learning models 164 as described above to a remote device 112. Alternatively or additionally, execution result interface 168 may include and/or generate a program that transmits execution parameters to computing device 104 and/or a server and/or remote device 112, which may contain one or more elements of data structure, and receives from such server and/or remote device 112 an execution result. Any combination of above-described deployment options may be realized using a recursive combination of trees and/or other elements as described above; for instance, some subtrees, machine-learning models 164, databases, and/or rule modules 120 may be exported to an end-user client device, while others may be on a remote device 112 and/or server.

Still referring to FIG. 1, execution result interface 168 may include one or more output integrations allow modules included in and/or generated by execution result interface 168 to interconnect with other applications and/or platforms. This may be performed, without limitation, by configuration of execution result interface 168 and/or modules produced thereby to receive execution parameters from such other applications and/or platforms, to transmit execution results to such other applications and/or platforms, and/or to transmit and/or receive data from such other applications and/or platforms from within rule modules 120.

Figure 2:
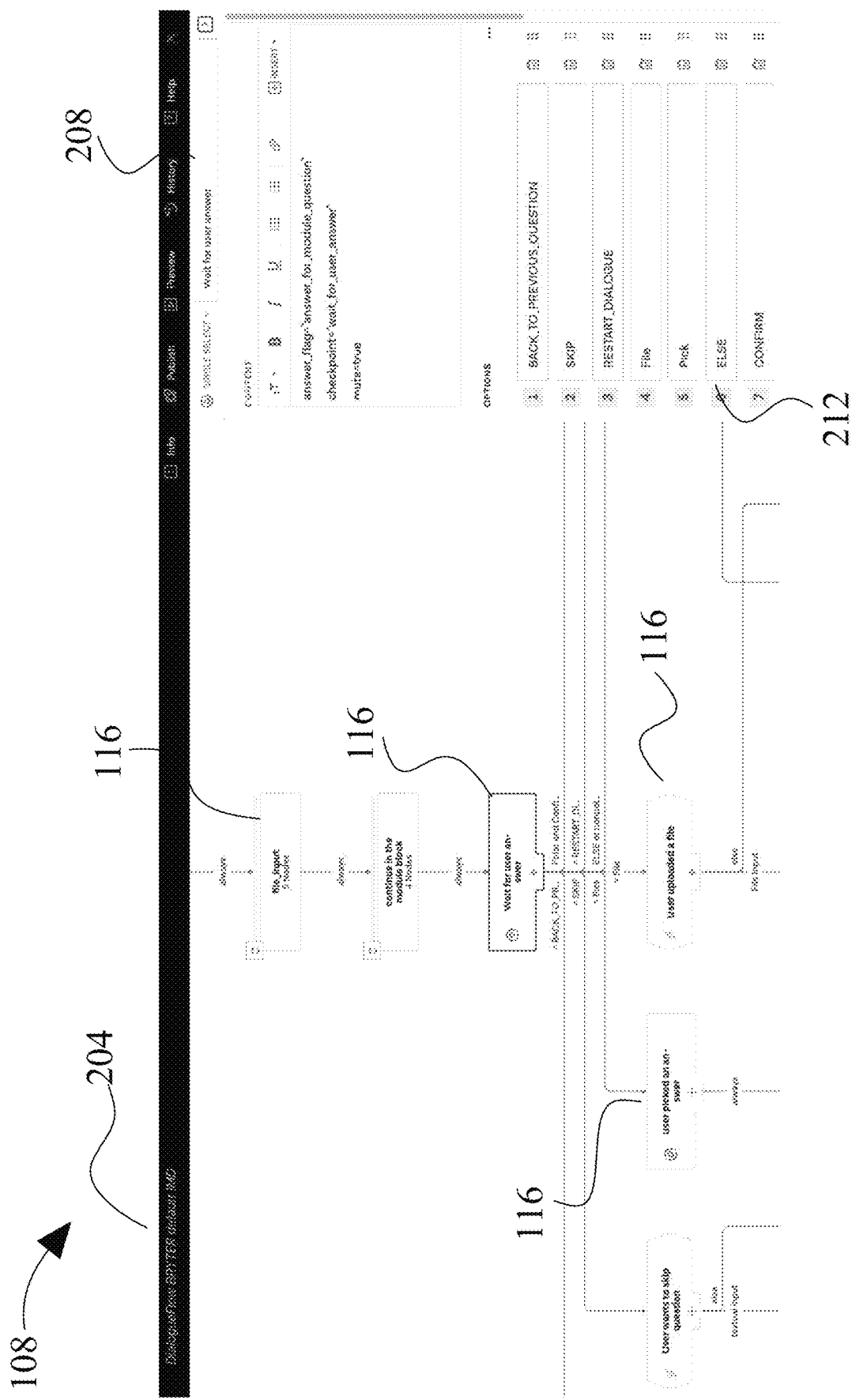
FIG. 2 is a screenshot illustrating an exemplary embodiment of a visual interface.

Referring to FIG. 2, an exemplary embodiment of a visual interface 108 is illustrated. Visual interface 108 may include a window 204 in which graphical models 116, and/or combinations thereof, to be used may be displayed. Visual interface 108 may include one or more graphical locator (not shown) and/or cursor facilities allowing a user to interact with graphical models 116 and/or combinations thereof, for instance using a touchscreen, touchpad, mouse, keyboard, and/or other manual data entry device. Visual interface 108 may include one or more menus 208 and/or panels permitting selection of tools, options, graphical models 116 to be displayed and/or used, elements of data, functions, or other aspects of graphical models 116 to be edited, added, and/or manipulated, options for importation of and/or linking to application programmer interfaces APIs, exterior services, databases, machine-learning models 164, and/or algorithms, or the like. One or more menus 208 may be used to identify labels 212 for output branches from a rule module and/or graphical model; labels 212 may correspond to events detected and/or outcomes of actions performed at a rule module represented by a graphical model 116.

Figure 3:
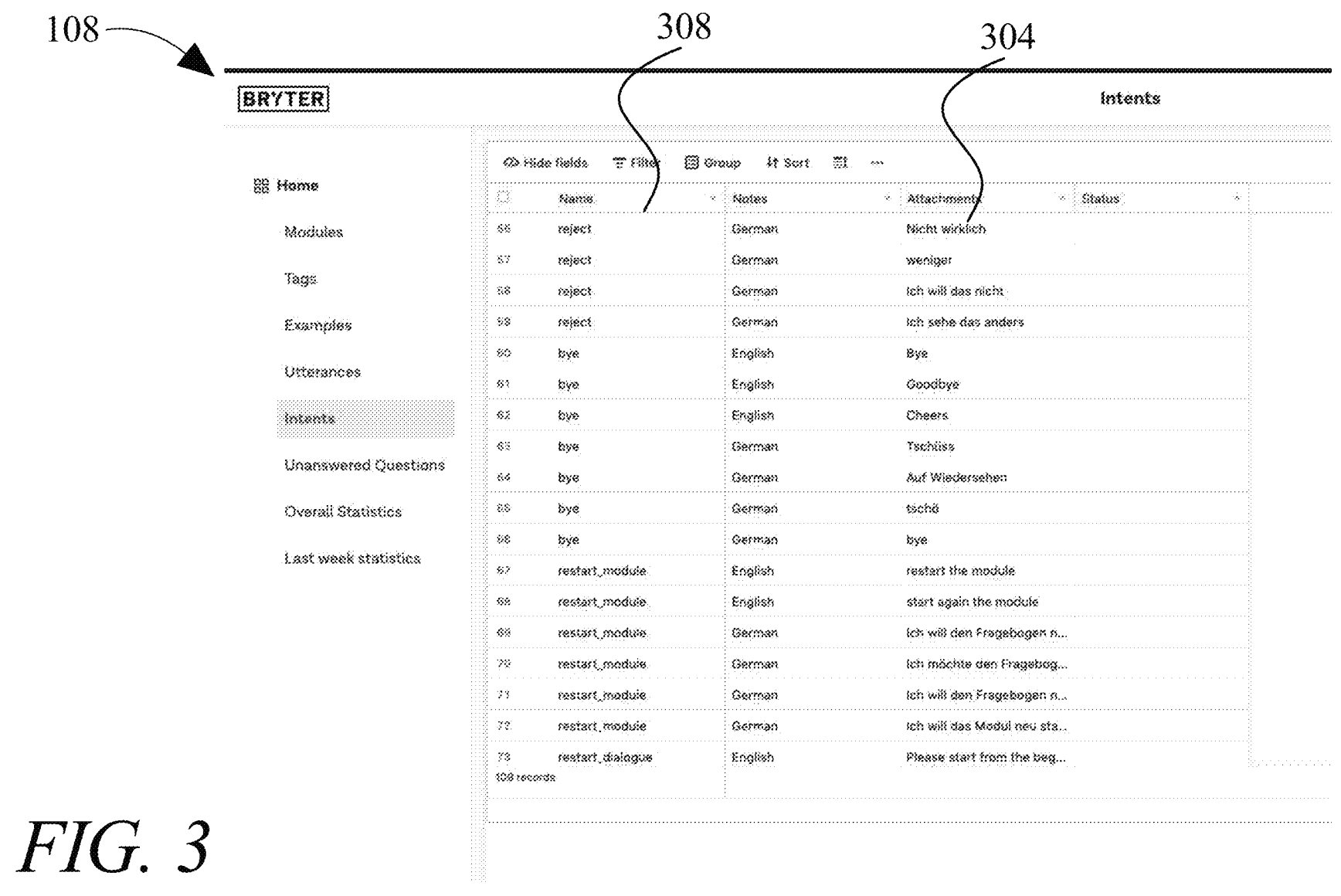

Referring now to FIG. 3, an exemplary embodiment of a portion of visual interface 108 including a listing of textual inputs 304 from a user and corresponding actions 308 are listed. In an embodiment, and without limitation, a chatbot 176 may compare such inputs 304 to corresponding actions 308, and navigate a decision tree as described above accordingly. Such inputs 304 may be classified to actions 308 using any classification process as described above, and/or may be linked to rules by user inputs using an interface, for instance as shown. Actions may include actions corresponding to any input to decision tree and/or any input processed by a rule module; for instance, a rule module may prompt a user to provide an input on which an action and/or decision performed by rule module may depend, for instance using a conditional statement. Multiple inputs 304 may map to a single action 308. Such relationships between inputs and actions may be used to update chatbot 176.

Figure 4:
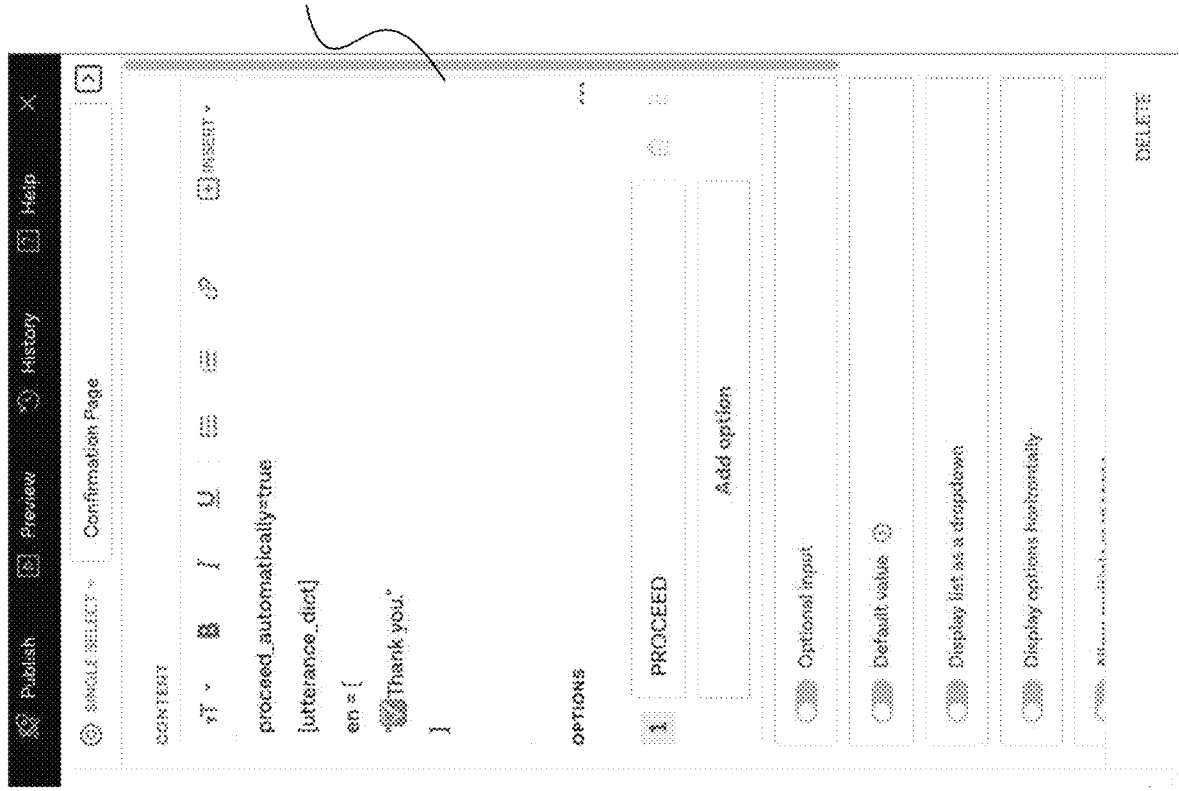
FIG. 4 is a screenshot illustrating an exemplary embodiment of a visual interface.

Referring now to FIG. 4, an exemplary embodiment of a portion of visual interface 108 including a user-configurable rule 404 for use in a rule module as described above is illustrated. User configurable rule 404 may include text to be output by a chatbot 176, as well as one or more user-entered labels identifying a subsequent rule module; user and/or rule module may generate rules for proceeding to one or more labels.

Figure 5:
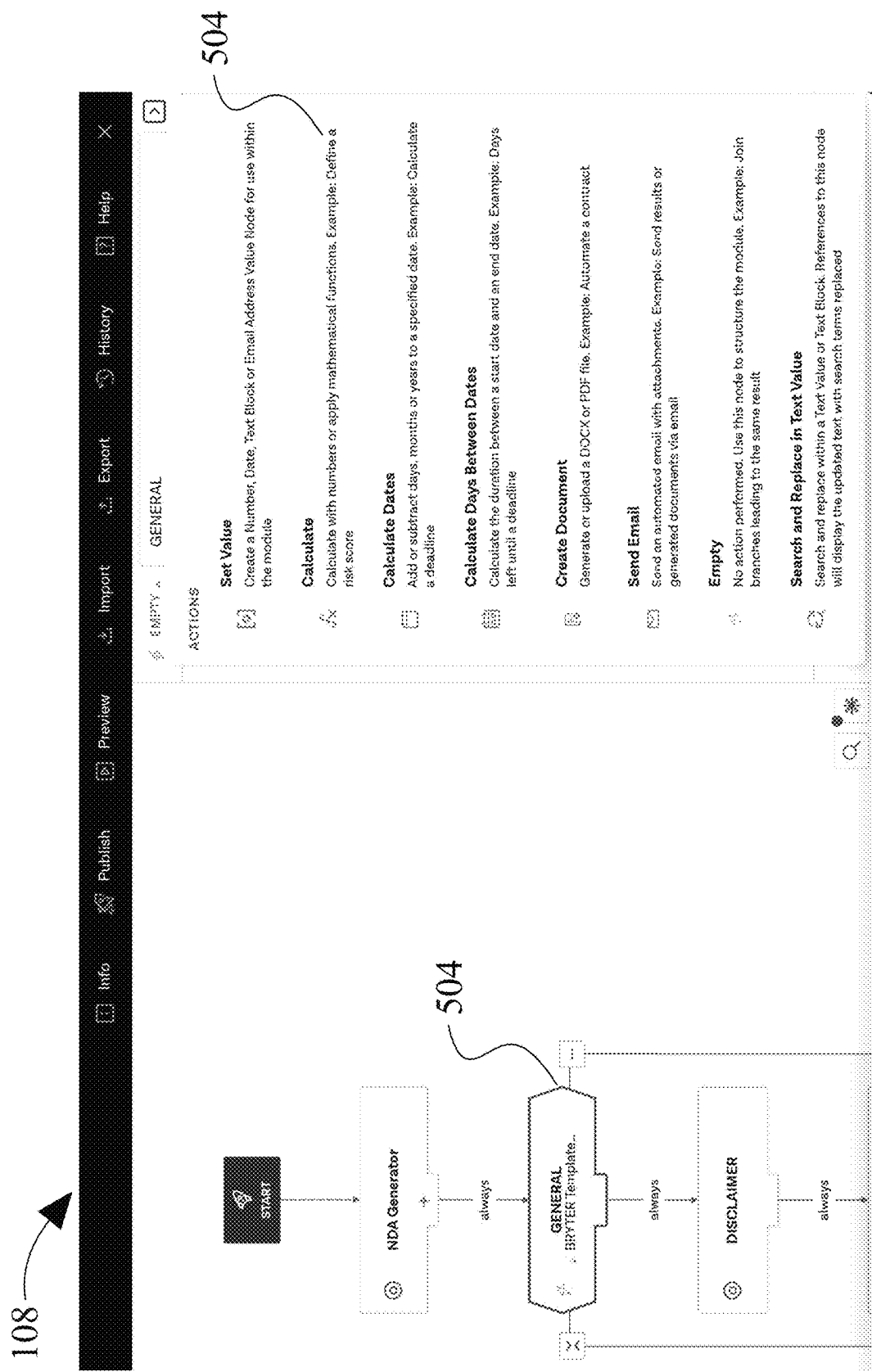
FIG. 5 is a screenshot illustrating an exemplary embodiment of a visual interface.

Referring now to FIG. 5, an exemplary embodiment of a portion of visual interface 108 including a general rule template 504 configurable by a user is illustrated. Selection and/or placement of general rule template 504 may cause interface 108 to provide a menu 508 of actions to be performed by a rule module constructed using general rule template 504. Actions may include options such as setting a value, which may include creation of a number, date, text block, email address. Actions may include a calculation, using for instance a mathematical function input by a user and/or incorporated using a function call, API call, or the like. Actions may include a process to calculate dates, for instance by adding or subtracting some unit of time, determining a period of time between dates and/or times, or the like. Actions may include creation of a document, for instance using a document generator as described above. Actions may include transmission of an electronic communication such as an email, which may include attachments. Actions may include an empty action, in which a rule module acts as a node joining multiple paths from other nodes, and automatically proceeds to one or more subsequent nodes, or a node containing other nodes which enables the nodes to be referred to and/or treated as a single block. An action may include an action to search for and/or replace texts in a block of text.

Referring now to FIG. 6, an exemplary embodiment of a visual interface 108 including an email generation template is illustrated. Email generation template may include one or more fields 604, such as email address fields, fields in a subject, title, email body, or the like, to be populated and/or replaced by variable values as generated and/or retrieved by rule modules.

Figure 7:
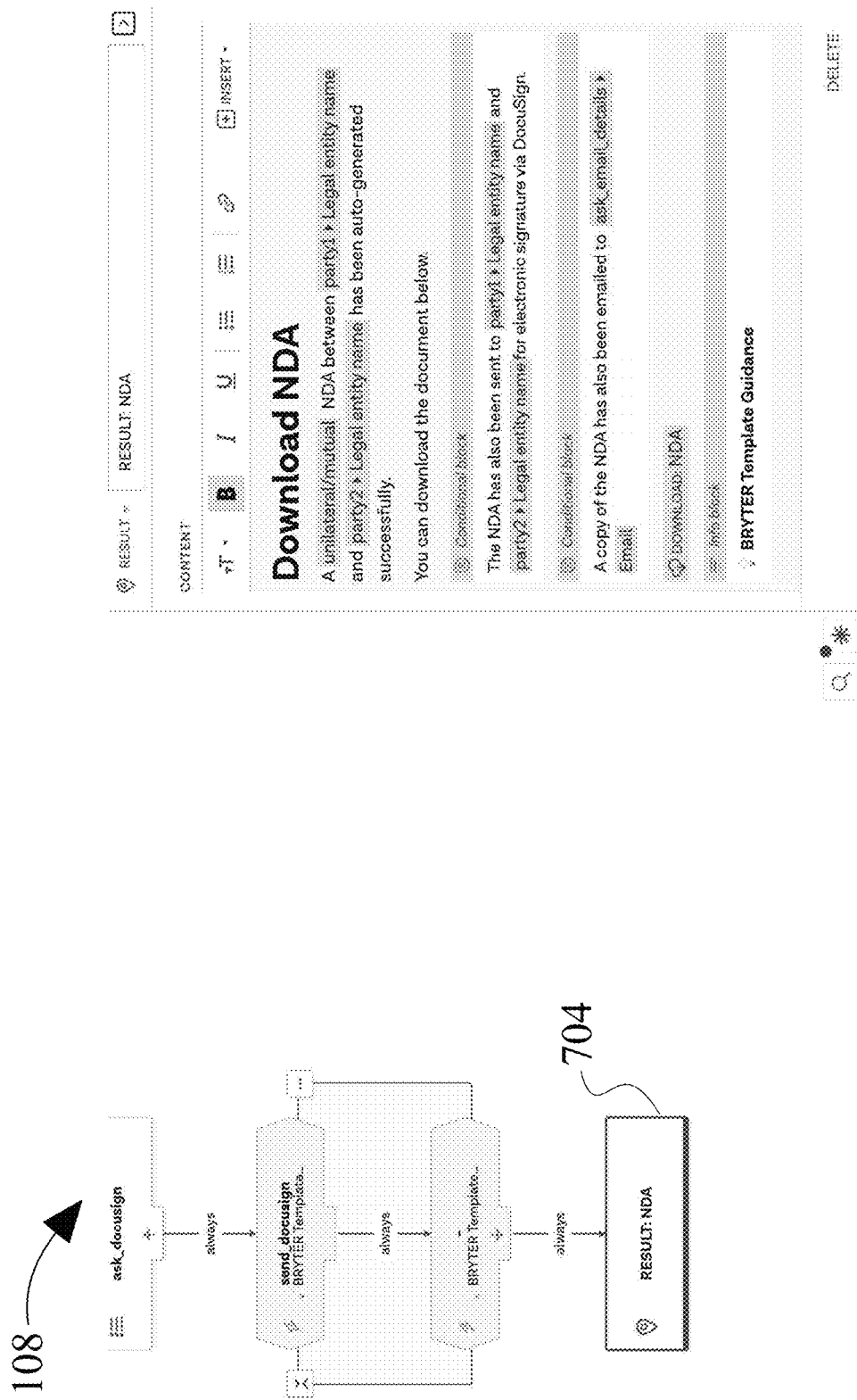
FIG. 7 is a screenshot illustrating an exemplary embodiment of a visual interface.

Referring now to FIG. 7, an exemplary embodiment of a visual interface 108 including a result node 704 is illustrated. Result node 704 may perform one or more terminal actions, which may include, without limitation generation of a document such as a non-disclosure document (NDA) or the like. Terminal action may include notification of one or more users of actions performed, along with any action described above as selectable for general rule modules.

Referring now to FIG. 8, an exemplary embodiment of a visual interface 108 including a form 804 permitting a user to identify database fields is illustrated. A user may enter names of database fields as well as data types to be entered in the fields. Data types may include, without limitation, text, identifiers which may be specified as unique identifiers, email addresses, dates, and/or any other data structure.

Figure 9:
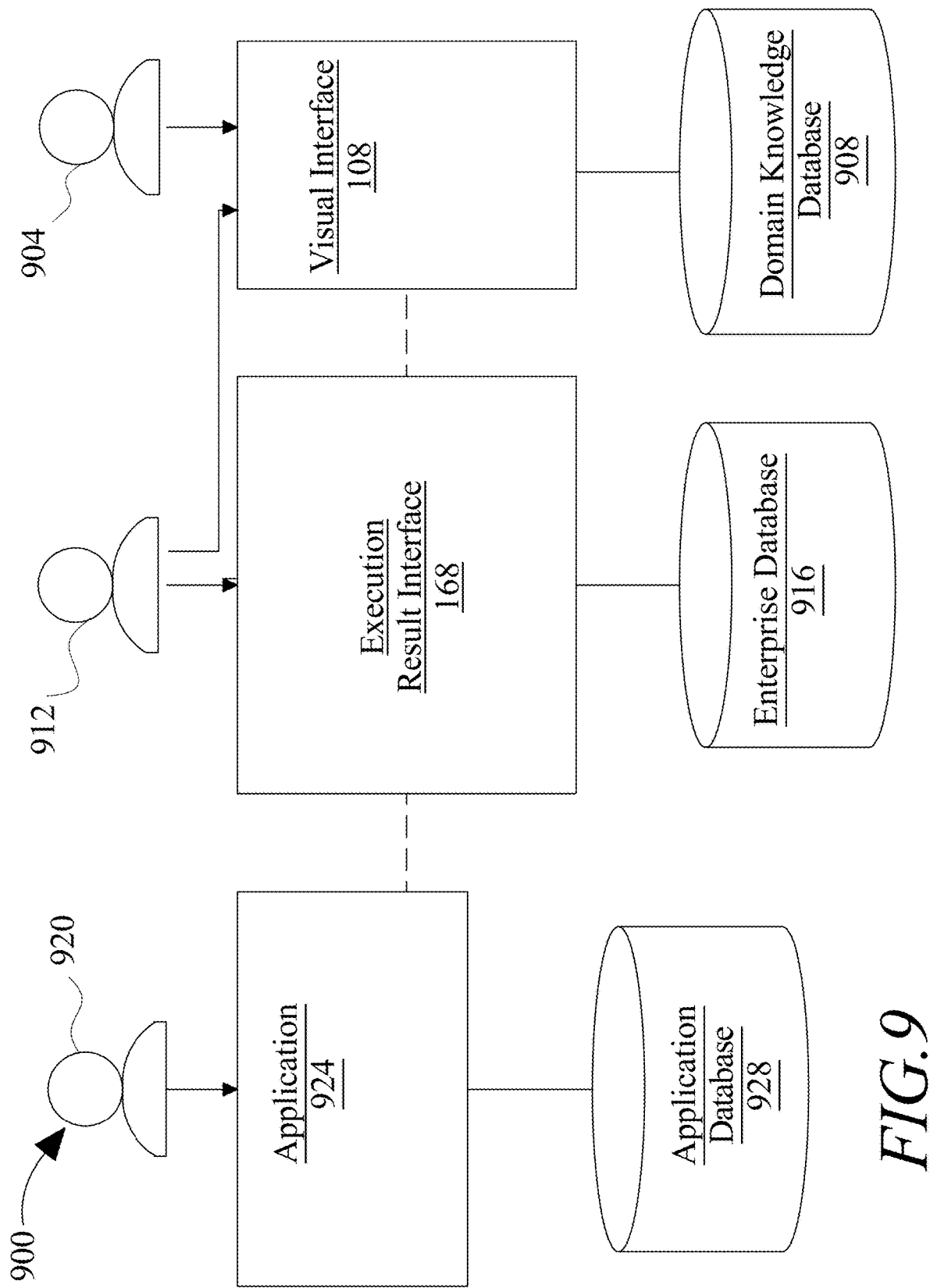
FIG. 9 is a block diagram of an exemplary embodiment of a system architecture.

Referring now to FIG. 9, an exemplary embodiment of an architectural overview 900 is illustrated. At least a domain expert 904 may provide domain knowledge, selections of graphical models 116, and/or relational identifications 124 as described above to computing device 104 and/or another device in system 100; such domain knowledge, selections of graphical models 116, and/or relational identifications 124 may be provided in, via, and/or at visual interface 108 as described above. Domain knowledge may be used as and/or in training data as described above.

Still referring to FIG. 9, domain knowledge may be stored in a domain knowledge database 908. Domain knowledge database 908 may be implemented, without limitation, as a relational domain knowledge database 908, a key-value retrieval domain knowledge database 908 such as a NOSQL domain knowledge database 908, or any other format or structure for use as a domain knowledge database 908 that a person skilled in the art would recognize as suitable upon review of the entirety of this disclosure. Domain knowledge database 908 may alternatively or additionally be implemented using a distributed data storage protocol and/or data structure, such as a distributed hash table or the like. Domain knowledge database 908 may include a plurality of data entries and/or records as described above. Data entries in a domain knowledge database 908 may be flagged with or linked to one or more additional elements of information, which may be reflected in data entry cells and/or in linked tables such as tables related by one or more indices in a relational domain knowledge database 908. Persons skilled in the art, upon reviewing the entirety of this disclosure, will be aware of various ways in which data entries in a domain knowledge database 908 may store, retrieve, organize, and/or reflect data and/or records as used herein, as well as categories and/or populations of data consistently with this disclosure. Domain knowledge may be received from domain knowledge database 908 to generate training data and/or for other uses in system 100. Domain knowledge may be iteratively and/or continuously received from domain experts 904.

With continued reference to FIG. 9, domain knowledge may be periodically or continuously turned into new training examples, which may be periodically to refine machine-learning models 164; for instance, domain experts may view execution result interface 168 and/or results generated therefrom and provide further domain knowledge as feedback, correction, and/or refinement, which may be used as and/or in training examples to further refine operation of execution result interface 168. Domain experts 904 may also modify and/or correct graphical models 116, rule modules 120, and/or relational identifications 124 to further refine and/or correct execution result interface 168 and/or new iterations and/or versions thereof.

Further referring to FIG. 9, visual interface 108 and/or computing device 104 may receive inputs from one or more developers 912. Developers 912 may perform additional programming tasks, such as generation of bespoke programming, integration of APIs, links to additional programs or databases, or the like as described above. Developers may modify rule modules 120 to include one or more programs, scripts, and/or other elements, and/or may correct, refine, and/or modify one or more elements of source code and/or executable code of and/or used by one or more rule modules 120. Developers may submit domain knowledge, selections of graphical models 116, and/or relational identifications 124, and/or modifications thereto in or to visual interface 108; domain knowledge and/or modifications thereto may be used to modify training data and/or may be stored in domain knowledge database 908. Alternatively or additionally developers 912 may perform modifications to execution result interface 168 outside of visual interface 108.

Still referring to FIG. 9, source code, parameters, configurations, and/or other data and/or code received from developers 912 may be stored in an enterprise database 916. Enterprise database 916 may be implemented in any manner suitable for implementation of domain knowledge database 908.

Continuing to refer to FIG. 9, one or more end-users 920 may interact with an application 924 generated by, included in, and/or including execution result interface 168. Application 924 may be implemented in any manner that may occur to persons skilled in the art upon reviewing the entirety of this disclosure, including without limitation in any manner described above in reference to FIGS. 1-2. Data received by, processed by, and/or used by application may be stored, modified, and/or retrieved from an application database 928, which may be implemented in any manner suitable for the implementation of domain knowledge database 908 as described above.

Figure 10:
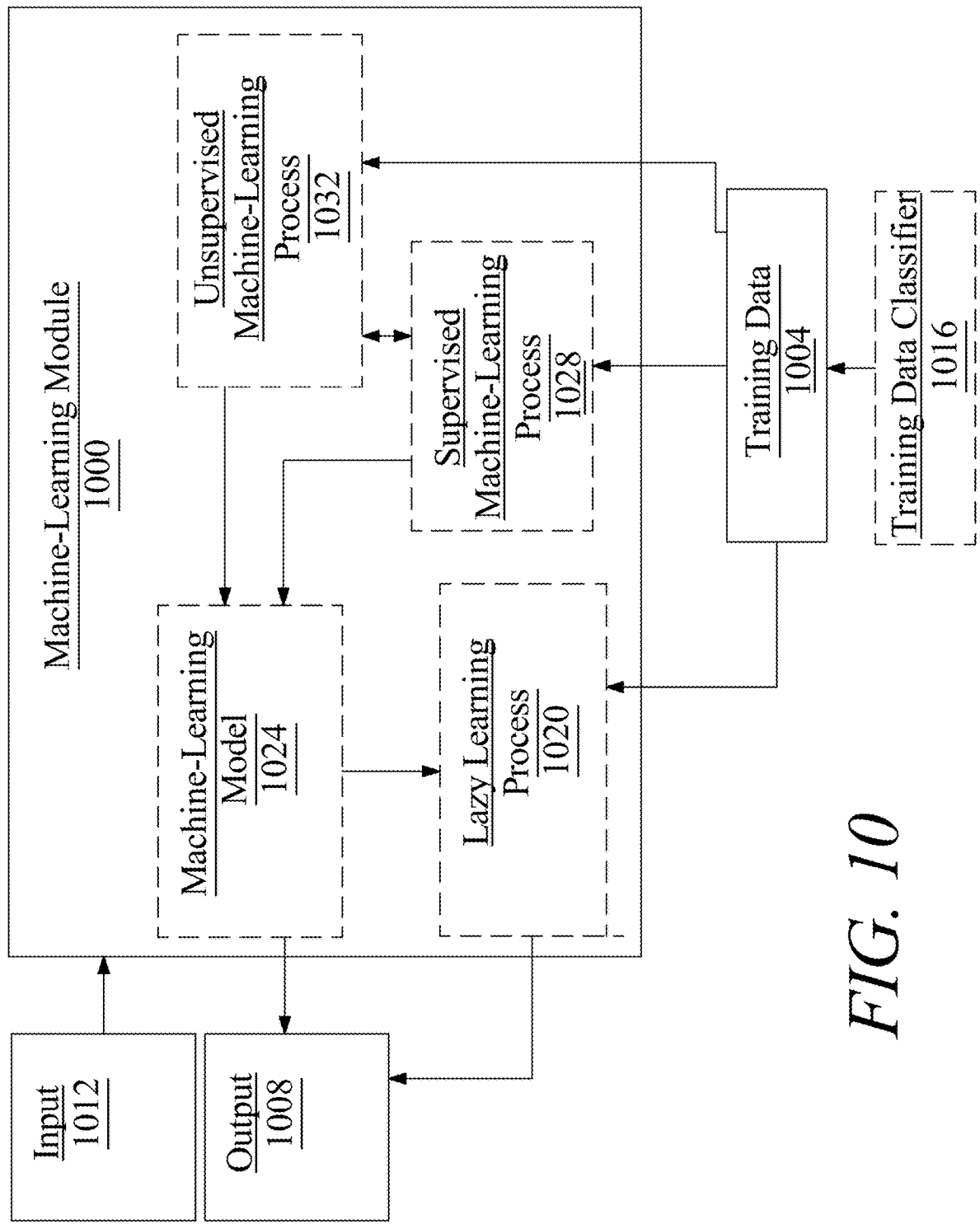
FIG. 10 is a block diagram illustrating an exemplary embodiment of a machine-learning module.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model 164 as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device 104 and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees 152, boosted trees, random forest classifiers, learning vector quantization, and/or neural network-based classifiers.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees 152, such as decision tree 152 classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 11:
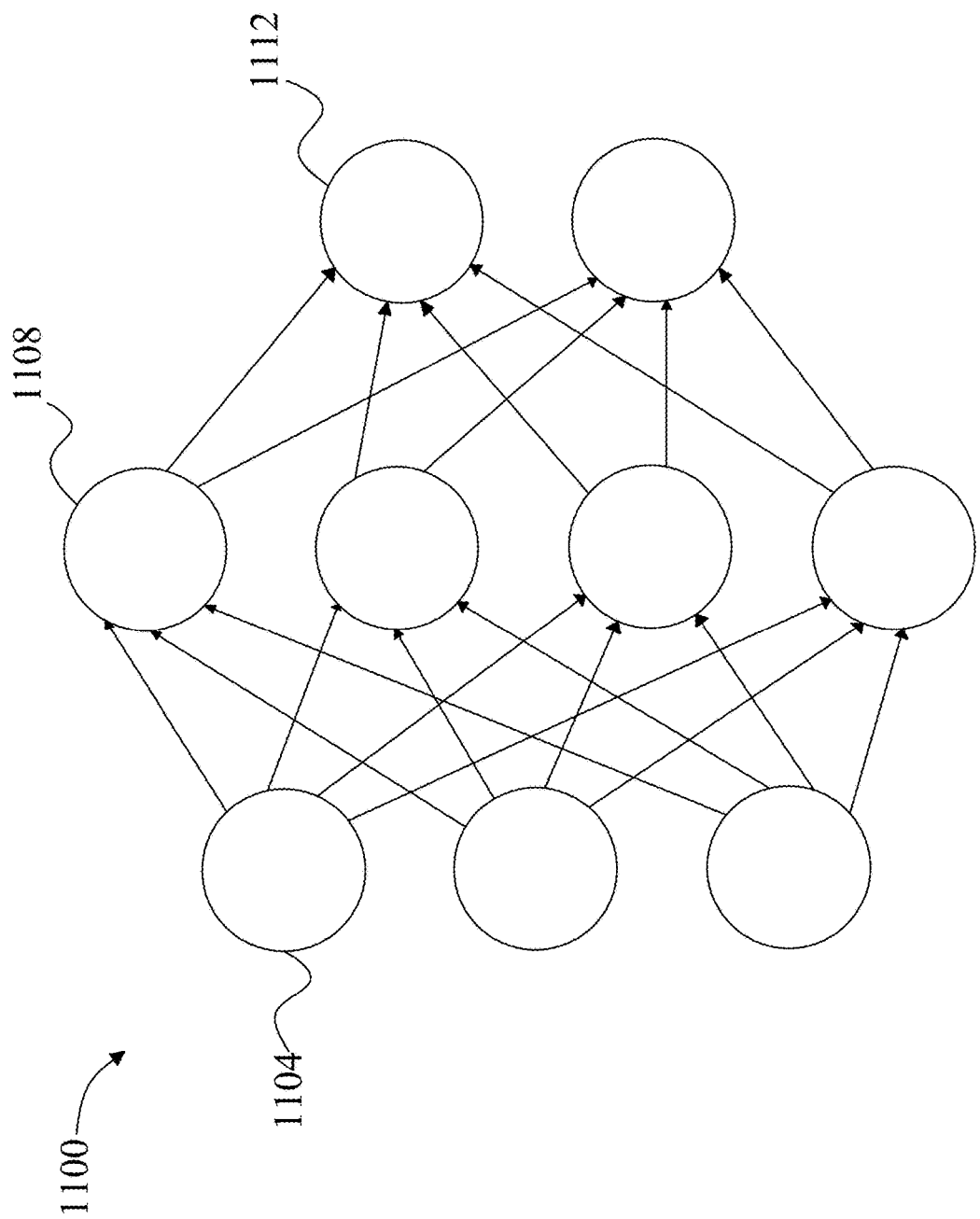
FIG. 11 is a block diagram illustrating an exemplary embodiment of a neural network.

Referring now to FIG. 11, an exemplary embodiment of neural network 1100 is illustrated. Neural network 1100 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Figure 12:
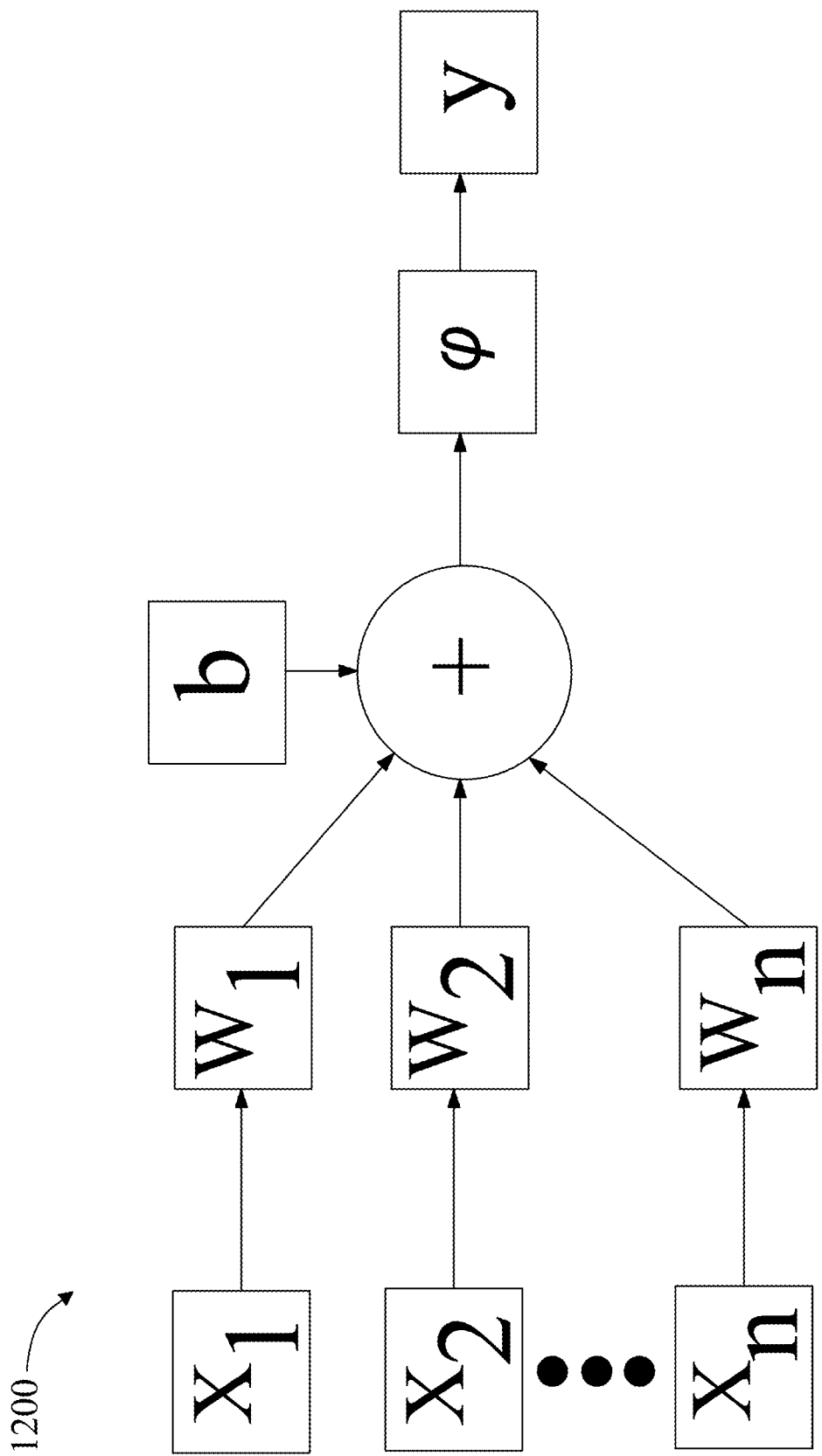
FIG. 12 is a block diagram illustrating an exemplary embodiment of a node in a neural network.

Referring now to FIG. 12, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 12, a neural network may receive semantic units as inputs and output vectors representing such semantic units according to weights $w_i$ that are derived using machine-learning processes as described in this disclosure.

Figure 13:
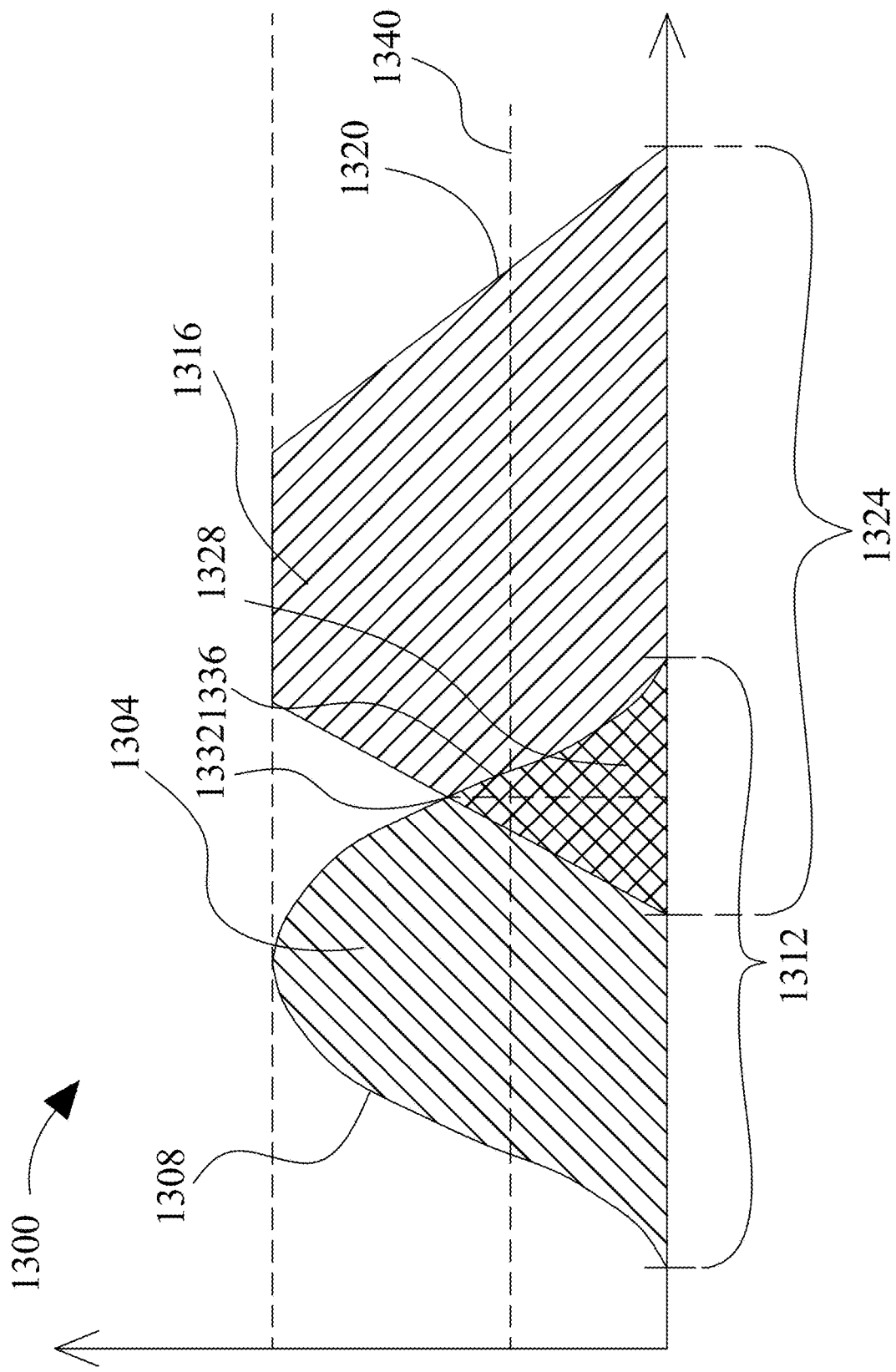
FIG. 13 is schematic diagram illustrating exemplary embodiments of membership functions.

Referring to FIG. 13, an exemplary embodiment of fuzzy set comparison 1300 is illustrated. A first fuzzy set 1304 may be represented, without limitation, according to a first membership function 1308 representing a probability that an input falling on a first range of values 1312 is a member of the first fuzzy set 1304, where the first membership function 1308 has values on a range of probabilities such as without limitation the interval [0,1], and an area beneath the first membership function 1308 may represent a set of values within first fuzzy set 1304. Although first range of values 1312 is illustrated for clarity in this exemplary depiction as a range on a single number line or axis, first range of values 1312 may be defined on two or more dimensions, representing, for instance, a Cartesian product between a plurality of ranges, curves, axes, spaces, dimensions, or the like. First membership function 1308 may include any suitable function mapping first range 1312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 13, first fuzzy set 1304 may represent any value or combination of values as described above, including probabilistic output 132, a predetermined class, such as without limitation an approved class or a denied class, and/or any combination of the above. A second fuzzy set 1316, which may represent any value which may be represented by first fuzzy set 1304, may be defined by a second membership function 1320 on a second range 1324; second range 1324 may be identical and/or overlap with first range 1312 and/or may be combined with first range via Cartesian product or the like to generate a mapping permitting evaluation overlap of first fuzzy set 1304 and second fuzzy set 1316. Where first fuzzy set 1304 and second fuzzy set 1316 have a region 1328 that overlaps, first membership function 208 and second membership function 1320 may intersect at a point 1332 representing a probability, as defined on probability interval, of a match between first fuzzy set 1304 and second fuzzy set 1316. Alternatively or additionally, a single value of first and/or second fuzzy set may be located at a locus 1336 on first range 1312 and/or second range 1324, where a probability of membership may be taken by evaluation of first membership function 1308 and/or second membership function 1320 at that range point. A probability at 1328 and/or 1332 may be compared to a threshold 1340 to determine whether a positive match is indicated. Threshold 1340 may, in a non-limiting example, represent a degree of match between first fuzzy set 1304 and second fuzzy set 1316, and/or single values therein with each other or with either set, which is sufficient for purposes of the matching process; for instance, threshold may indicate a sufficient degree of overlap between a probabilistic output 132 and a predetermined class for combination to occur as described above. Alternatively or additionally, each threshold may be tuned by a machine-learning and/or statistical process, for instance and without limitation as described in further detail below.

Figure 14:
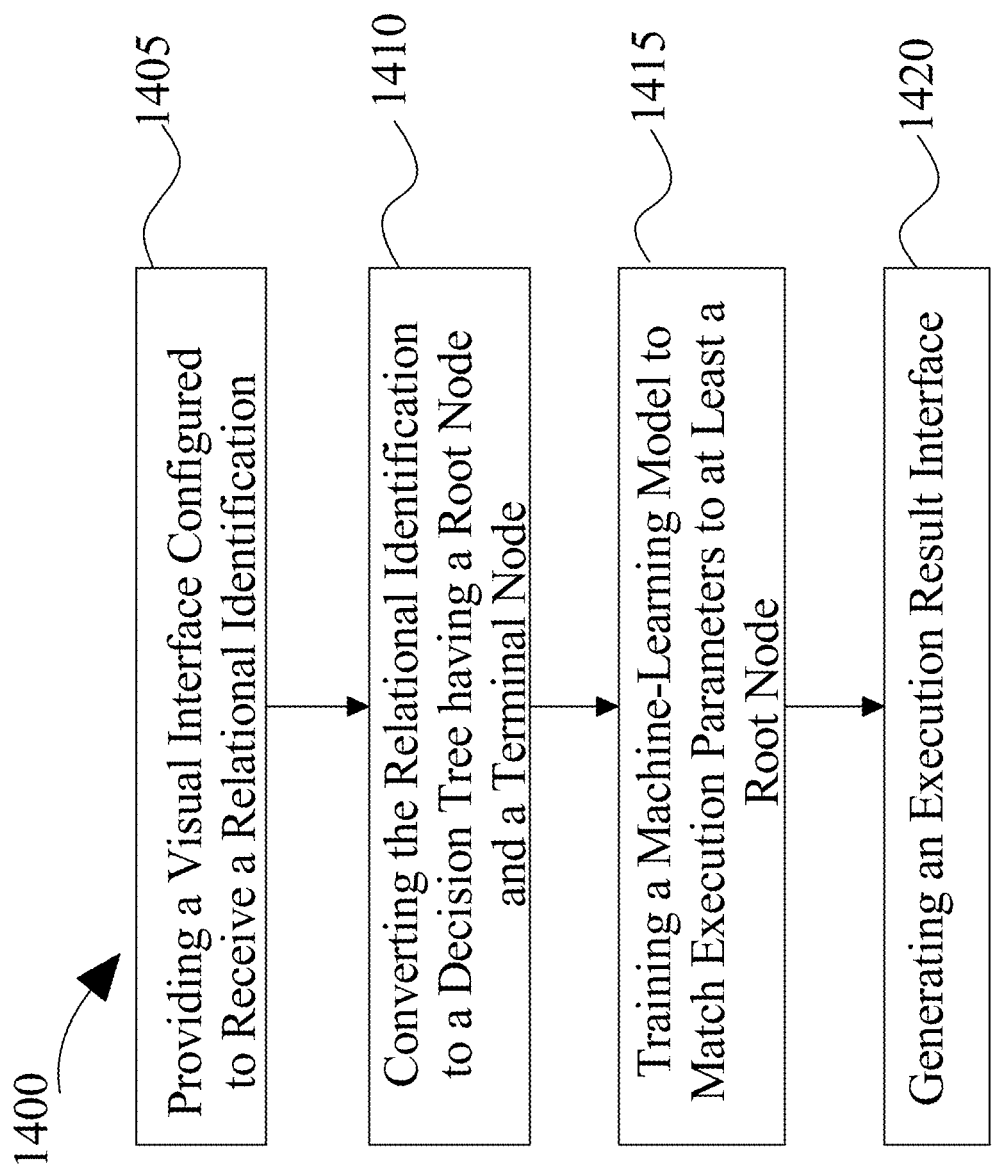
FIG. 14 is a flow diagram illustrating an exemplary embodiment of a method of generating a data structure using graphical models.

Referring now to FIG. 14, an exemplary embodiment of a method 1400 of generating a data structure is illustrated. At step 1405, a computing device 104 provides a visual interface 108 at a remote device 112; this may be implemented, without limitation, as described above in reference to FIGS. 1-5. Visual interface 108 may be configured to provide a plurality of graphical models 116 of a plurality of rule modules 120, wherein each graphical model 116 of the plurality of graphical models 116 represents a rule module 120 of the plurality of rule modules 120. Visual interface 108 may be configured to receive a relational identification 124 of at least a graphical model 116 of plurality of graphical models 116, the relational indication including at least an entry indication 128 and at least an exit indication 132. In some embodiments, visual interface 108 may be further configured to receive at least a domain information identification corresponding to the relational identification 124. Visual interface 108 may be further configured to receive at least a document type corresponding to the at least an entry indication 128. Visual interface 108 may be further configured to receive at least an entry pattern 140 corresponding to the at least an entry indication 128. Visual interface 108 may be further configured to generate a simulated execution interface.

At step 1410, and still referring to FIG. 14, computing device 104 converts relational identification 124 into a relational model at least a decision tree 152 having at least a root node 156 corresponding to the at least an entry indication 128 and at least a terminal node 160 corresponding to the at least an exit indication 132; this may be implemented, without limitation, as described above in reference to FIGS. 1-5.

At step 1415, and continuing to refer to FIG. 14, computing device 104 trains a machine-learning model 164 to match execution parameters to at least a root node 156; this may be implemented, without limitation, as described above in reference to FIGS. 1-5. In some embodiments, machine-learning model 164 may include a classifier. As an additional non-limiting example, machine-learning model 164 is may be configured to classify execution parameter to a document type and map the execution parameter to at least a root node 156 as a function of the document type. As a further non-limiting example, machine-learning model 164 may be configured to classify execution parameter to a fact pattern and map the execution parameter to at least a root node 156 as a function of the fact pattern.

At step 1420, and still referring to FIG. 14, computing device 104 generates an execution result interface configured to receive at least an execution parameter, map the at least an execution parameter to at least a root node 156 using machine-learning model 164, and generate an execution result at and/or from at least a terminal node 160 using at least a decision tree 152; this may be implemented, without limitation, as described above in reference to FIGS. 1-5. Execution result interface may be further configured to generate a document as a function of execution result. Execution result interface may be further configured to initiate a textual conversation with a remote device 112 as a function of the execution result.

It is to be noted that any one or more of the aspects and embodiments described herein may be conveniently implemented using one or more machines (e.g., one or more computing devices that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device 104) and any related information (e.g., data structures and data) that causes the machine to perform any one of the methodologies and/or embodiments described herein.

Examples of a computing device 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 15:
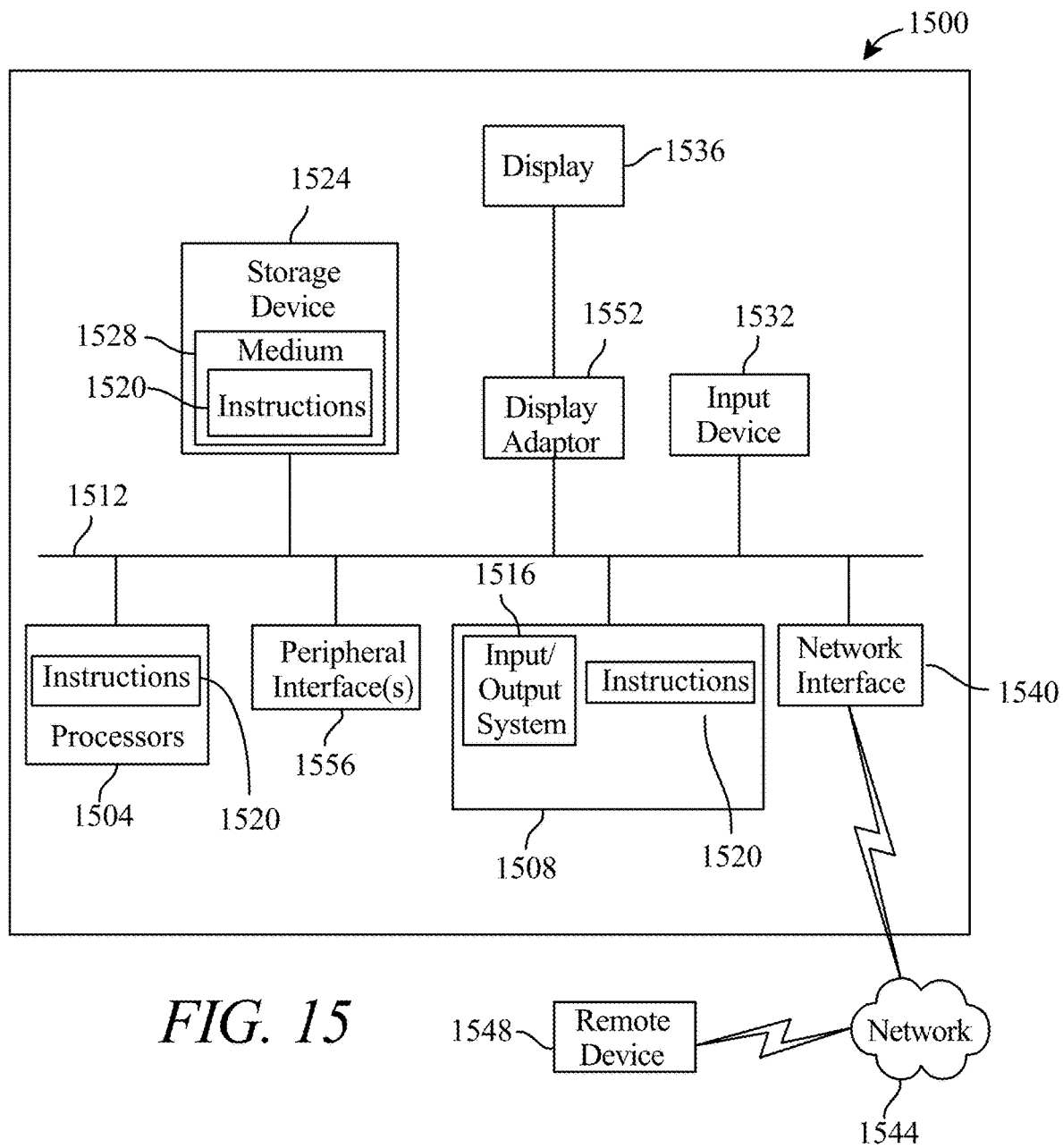
FIG. 15 is a block diagram of a computing system that can be used to implement any one or more of the methodologies disclosed herein and any one or more portions thereof.

FIG. 15 shows a diagrammatic representation of one embodiment of a computing device 104 in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Processor 1504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1504 may be organized according to Von Neumann and/or Harvard architecture as a non-limiting example. Processor 1504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a data structure using graphical models, the system including:
   a computing device, the computing device configured to:
      provide a visual interface at a remote device, the visual interface configured to:
         provide a plurality of graphical models of a plurality of rule modules, wherein each graphical representation of the plurality of graphical models represents a rule module of the plurality of rule modules; and
         receive a relational identification of at least a graphical representation of the plurality of graphical models, the relational identification including at least an entry indication and at least an exit indication;
      receive at least a domain information identification corresponding to the relational identification, wherein the at least a domain information identification includes domain knowledge and at least a decision criterion;
      produce a first output and a second output, wherein the first output includes a debug interface and the second output includes a simulation execution interface;
      convert the relational identification into at least a decision tree having at least a root node corresponding to the at least an entry indication and at least a terminal node corresponding to the at least an exit indication;
      train a machine-learning model to match execution parameters to the at least a root node;
      generate an execution result interface configured to receive at least an execution parameter, map the at least an execution parameter to the at least a root node using the machine-learning model, and generate an execution result at the at least a terminal node using the at least a decision tree and the at least a decision criterion.

2. The system of claim 1, wherein the visual interface is further configured to receive at least a document type identification corresponding to the at least an entry indication.

3. The system of claim 1, wherein the visual interface is further configured to receive at least an entry pattern corresponding to the at least an entry indication.

4. The system of claim 1, wherein the machine-learning model further comprises a classifier.

5. The system of claim 1, wherein the machine-learning model is further configured to:
classify the execution parameter to a document type; and
map the execution parameter to the at least a root node as a function of the document type.

6. The system of claim 1, wherein the machine-learning model is further configured to:
classify the execution parameter to a fact pattern; and
map the execution parameter to the at least a root node as a function of the fact pattern.

7. The system of claim 1, wherein the execution result interface is further configured to generate a document as a function of the execution result.

8. The system of claim 1, wherein the execution result interface is further configured to initiate a textual conversation with a remote device as a function of the execution result.

9. The system of claim 1, wherein the visual interface is further configured to display the first output and the second output concurrently.

10. The system of claim 9, wherein the debug interface includes information on at least an execution error.

11. The system of claim 1, wherein the execution parameter is received from a chatbot.

12. The system of claim 11, wherein the execution result interface is further configured to interface conversationally with a user using the chatbot, and wherein the chatbot is configured to utilize a natural language processing model and an associated layer to translate text output to voice output and voice input to text input.

13. A method of generating a data structure using graphical models, the method comprising:
providing, by a computing device, a visual interface at a remote device, the visual interface configured to:
provide a plurality of graphical models of a plurality of rule modules, wherein each graphical model of the plurality of graphical models represents a rule module of the plurality of rule modules; and
receive a relational identification of at least a graphical model of the plurality of graphical models, the relational identification including at least an entry indication and at least an exit indication;
receive at least a domain information identification corresponding to the relational identification, wherein the at least a domain information identification includes domain knowledge and at least a decision criterion;
produce a first output and a second output, wherein the first output includes a debug interface and the second output includes a simulation execution interface;
converting, by the computing device, the relational identification into a relational model at least a decision tree having at least a root node corresponding to the at least an entry indication and at least a terminal node corresponding to the at least an exit indication;
training, by the computing device, a machine-learning model to match execution parameters to the at least a root node;
generating, by the computing device, an execution result interface configured to receive at least an execution parameter, map the at least an execution parameter to the at least a root node using the machine-learning model, and generate an execution result at the at least a terminal node using the at least a decision tree and the at least a decision criterion.

14. The method of claim 13, wherein the visual interface is further configured to receive at least a document type corresponding to the at least an entry indication.

15. The method of claim 13, wherein the visual interface is further configured to receive at least an entry pattern corresponding to the at least an entry indication.

16. The method of claim 13, wherein the machine-learning model further comprises a classifier.

17. The method of claim 13, wherein the machine-learning model is further configured to:
classify the execution parameter to a document type; and
map the execution parameter to the at least a root node as a function of the document type.

18. The method of claim 13, wherein the machine-learning model is further configured to:
classify the execution parameter to a fact pattern; and
map the execution parameter to the at least a root node as a function of the fact pattern.

19. The method of claim 13, wherein the execution result interface is further configured to generate a document as a function of the execution result.

20. The method of claim 13, wherein the execution result interface is further configured to initiate a textual conversation with a remote device as a function of the execution result.

* * * * *